(12) United States Patent
Potenza et al.

(10) Patent No.: US 7,066,992 B2
(45) Date of Patent: *Jun. 27, 2006

(54) SOLUBILIZED YELLOW DYES FOR INKS WITH IMPROVED OZONE AND LIGHT STABILITY

(75) Inventors: Joan C. Potenza, Rush, NY (US); Marcel B. Madaras, Webster, NY (US); Hans F. Schmitthenner, Rush, NY (US); David T. Southby, Rochester, NY (US); Mihaela L. Madaras, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 113 days.

This patent is subject to a terminal disclaimer.

(21) Appl. No.: 10/732,093

(22) Filed: Dec. 10, 2003

(65) Prior Publication Data

US 2005/0126431 A1   Jun. 16, 2005

(51) Int. Cl.
    *C09D 11/00* (2006.01)
(52) U.S. Cl. .................... 106/31.5; 106/31.58
(58) Field of Classification Search ........... 106/31.5, 106/31.58; 534/752
    See application file for complete search history.

(56) References Cited

U.S. PATENT DOCUMENTS

| | | | |
|---|---|---|---|
| 6,458,194 B1 * | 10/2002 | Mikoshiba et al. | 106/31.5 |
| 6,464,767 B1 | 10/2002 | Evans et al. | 106/31.5 |
| 6,468,338 B1 * | 10/2002 | Evans et al. | 106/31.5 |
| 6,582,502 B1 * | 6/2003 | Fujiwara | 106/31.48 |
| 6,855,195 B1 * | 2/2005 | Nishita et al. | 106/31.48 |
| 2001/0029869 A1 | 10/2001 | Fujiwara | 106/31.49 |
| 2003/0089274 A1 * | 5/2003 | Nishita et al. | 106/31.48 |

* cited by examiner

Primary Examiner—Helene Klemanski
(74) Attorney, Agent, or Firm—Paul A. Leipold

(57) ABSTRACT

The invention relates to an ink composition comprising solubilized yellow dyes for inks with improved ozone and light stability.

18 Claims, No Drawings

SOLUBILIZED YELLOW DYES FOR INKS WITH IMPROVED OZONE AND LIGHT STABILITY

FIELD OF THE INVENTION

The present invention relates to new dyes and their use in ink jet printing.

BACKGROUND OF THE INVENTION

Ink jet printing is a non-impact method for producing images by the deposition of ink droplets in a pixel-by-pixel manner to an image-recording element in response to digital signals. There are various methods that may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant, which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic solvents and high boiling organic solvents, such as hydrocarbons, esters, ketones, etc.

Materials used in inkjet printing inks must have the correct properties to provide an ink which is stable, possesses good printing properties and provides an image with good color, sharpness and image stability. Many dyes are known and used in inkjet printing inks. Many have some or most of these desirable properties but it is very difficult to find a dye which possesses all of the above attributes. Ink jet inks generally contain a dye that is soluble in an ink vehicle such as water or a mixture composed of water and a known water soluble or water miscible organic solvent. Typically the dyes are chosen from acid, direct and reactive dyestuffs developed for the dyeing of natural fibers such as paper, wool and cotton. Water solubility of these dyes is due to the incorporation of negatively charged substituent groups such as sulfo or carboxy. Dyes are degraded by ozone and light and their stability with regard to these two agents can differ depending on media and ink composition. There is a great need to develop dye-based inks which have high optical densities on receivers and also superior lightfastness and colorfastness when printed on different types of media, in particular, fast drying or porous media.

The yellow dyes currently in commercial aqueous ink formulations are less than optimal in one property or another. They are used because they achieve an acceptable but not superior balance of features. Some examples of such dyes are Direct Yellow 132 (CAS 10114-86-0) and Direct Yellow 86 (CAS 50295-42-3), which have good stability toward ozone and light but have less than optimal hue, Acid Yellow 23 (CAS 1934-21-0) and Acid Yellow 17 (CAS 6359-98-4) which have good hue and ozone fastness, but poor light stability. U.S. Pat. Nos. 6,468,338 and 6,464,767 disclose water-soluble azoindole dyes for use in ink jet printing including dyes derived from diazotizable heteroaromatic amines. However, there is a problem with some of these dyes in that they do not have sufficient stability to atmospheric ozone. US2001/0029869 discloses a large number of heterocyclic azo dyes, selected from a number of coupling classes and heterocyclic diazo moieties. These dyes have a range of stability, due to the different types of heterocyclic azo moieties which are part of their structures; some have poor, others have good stability to light and ozone, particularly on porous, fast-drying ink jet media. This property on porous media is important because such fast drying media is becoming more and more popular and, while most dyes are stable on gel-based or swellable media, porous media are more stringent in their demand for a high level of stability. The range of hue provided by these dyes also varies because there is such a wide variety of structure space covered by application US2001/0029869. However, the cited reference gives no guidance to one skilled in the art who wishes to select such dyes, or those moieties in the structure of the dyes, that provide the best performance in ozone and light stability, with the most desirable hue, when printed on porous ink jet media

PROBLEM TO BE SOLVED BY THE INVENTION

There remains a need to identify and select those dyes that are useful in producing a high quality image with preferred hue and improved light and ozone fastness. It would be most useful if these dyes performed well on both porous and swellable media.

SUMMARY OF THE INVENTION

It is an object of this invention to overcome disadvantages of prior inks.

It is another object to provide yellow inks with low fade.

These and other objects of the invention are generally accomplished by providing an ink composition comprising a dye, wherein said dye comprises a structure of formula I:

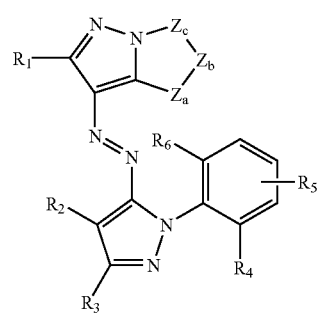

wherein $R_1$ represents a hydrogen atom, a cyano group, a substituted or unsubstituted alkyl group, a substituted or unsubstituted cycloalkyl group, a substituted or unsubstituted alkenyl group, a substituted or unsubstituted aralkyl group, an alkylthio group, an arylthio group an acyl group, a substituted acyl group, a carboxyl group, a carbamoyl group, or a heterocyclic group; Za represents one of —N=, —NH— or —N($R_8$)=; and Zb and Zc each independently represents one of —N= or —C($R_8$)=; $R_8$ represents a hydrogen, a substituted or unsubstituted alkyl or a substituted or unsubstituted alkenyl group, a substituted or unsubstituted alkynyl group or a heterocyclic group;

$R_2$ represents a hydrogen, a substituted or unsubstituted alkyl group, a substituted or unsubstituted aryl group, a halogen, a cyano group, a carboxyl or substituted carboxyl group, an acyl group, a substituted acyl group, a carbamoyl group, a nitro group, an alkyl or aryl sulfone, a sulfonic acid, a substituted or unsubstituted primary or secondary alkyl sulfonamide, a substituted or unsubstituted aryl sulfonamide or a heterocyclic group;

$R_3$ may be hydrogen or any non-metallic group;

$R_4$, $R_5$, $R_6$ may be H or any non-metallic group with the proviso that at least one of $R_4$ or $R_6$ represents any ionizable group which is capable of imparting water solubility to the dye;

$R_5$ may be present in any other position on the aromatic ring that is not occupied by $R_4$ or $R_6$;

ADVANTAGEOUS EFFECT OF THE INVENTION

The invention provides ink jet compositions of improved hue and light fastness.

DETAILED DESCRIPTION OF THE INVENTION

The invention has numerous advantages such as improved ozone and light fastness. The ink composition also has better fade resistance. The dyes of the present invention are easily synthesized by known methods, and have multiple advantages over known dye classes. Visually, the dyes appear bright yellow with very little orange tone. The inks formulated with these dyes give consistently pleasing colors and color reproduction in photographic ink jet applications. The dyes of this invention have superior light fastness and stability toward ozone compared with other dye classes, in particular when printed on porous silica or alumina based media. These and other advantages will be apparent from the detailed description below.

The present invention solves the aforementioned problems by providing a dye and an ink for inkjet recording which can be used to produce a high quality image with preferred hue and improved light and ozone fastness. The dye is represented by the general Formula I:

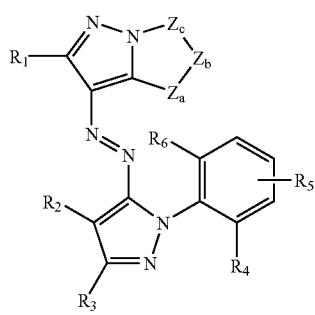

I wherein $R_1$ represents a hydrogen atom, a cyano group, a substituted or unsubstituted alkyl group, a substituted or unsubstituted cycloalkyl group, a substituted or unsubstituted alkenyl group, a substituted or unsubstituted aralkyl group, an alkylthio group, an arylthio group an acyl group, a substituted acyl group, a carboxyl group, a carbamoyl group, or a heterocyclic group; Za represents one of —N=, —NH— or —C($R_8$)=; and Zb and Zc each independently represents one of —N= or —C($R_8$)=; $R_8$ represents a hydrogen, a substituted or unsubstituted alkyl or a substituted or unsubstituted alkenyl group, a substituted or unsubstituted alkynyl group or a heterocyclic group;

$R_2$ represents a hydrogen, a substituted or unsubstituted alkyl group, a substituted or unsubstituted aryl group, a halogen, a cyano group, a carboxyl or substituted carboxyl group, an acyl group, a substituted acyl group, a carbamoyl group, a nitro group, an alkyl or aryl sulfone, a sulfonic acid, a substituted or unsubstituted primary or secondary alkyl sulfonamide, a substituted or unsubstituted aryl sulfonamide or a heterocyclic group;

$R_3$ may be hydrogen or any non-metallic group;

$R_4$, $R_5$, $R_6$ may be H or any non-metallic group with the proviso that at least one of $R_4$ or $R_6$ represents any ionizable group which is capable of imparting water solubility to the dye;

$R_5$ may be present in any other position on the aromatic ring that is not occupied by $R_4$ or $R_6$;

Any two of either $R_4$ and $R_5$ or $R_5$ and $R_6$ may be part of a carbocyclic or heterocyclic ring that is fused to the aromatic ring attached to the pyrazole nitrogen, with the proviso that at least one group capable of imparting water solubility to the dye is present in any position of either fused ring;

$R_5$ may be part of a carbocyclic or heterocyclic ring that is fused to the aromatic ring attached to the pyrazole nitrogen in any two adjacent positions not occupied by $R_4$ or $R_6$ with the proviso that at least one of $R_4$ or $R_6$ represents any ionizable group which is capable of imparting water solubility to the dye.

In a preferred embodiment, the ink composition contains a dye wherein said dye has adequate water solubility to enable preparation of an ink formulation containing between 0.2% and 10% dye.

In a preferred embodiment, the ink composition contains a dye wherein $R_4$, $R_5$ and $R_6$ may be selected from the following groups: sulfonate, carboxylate, hydroxyl, phosphonate, or substituted sulfonamide.

In a preferred embodiment, the ink composition contains a dye wherein $R_5$ is a group capable of imparting water solubility and may be selected from the following groups: sulfonate, sulfinate, carboxylate, hydroxyl, phosphonate, or substituted sulfonamide.

More Preferred dyes are represented by structures 2 and 3:

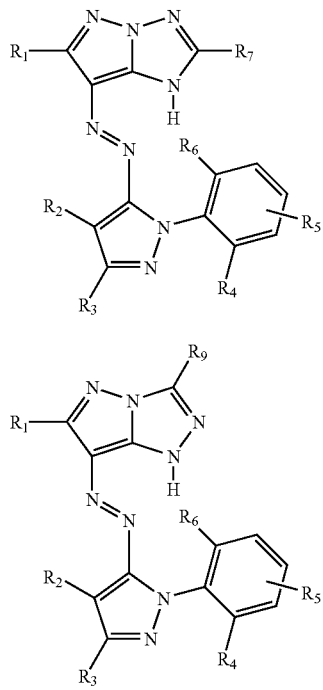

2

3

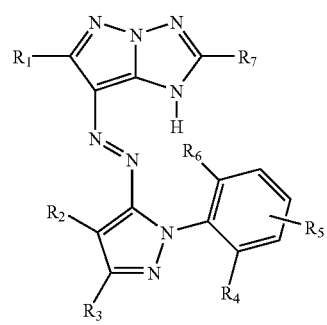

4

R<sub>7</sub> represents a hydrogen, a substituted or unsubstituted alkyl or a substituted or unsubstituted alkenyl or alkynyl group;

R<sub>9</sub> represents a hydrogen, a substituted or unsubstituted alkyl, a heterocyclic group, a substituted or unsubstituted alkenyl group.

In a more preferred embodiment, the ink composition contains a dye in which $R_1$ is an alkyl group;

$R_7$ and $R_9$ are substituted or unsubstituted alkyl groups.

In a more preferred embodiment, the ink composition contains a dye in which $R_9$ represents an alkyl group in which the carbon adjacent to the heterocyclic ring is substituted to the extent that it bears no more than one hydrogen atom.

In a more preferred embodiment, the ink composition contains a dye in which $R_9$ represents an alkyl group of one to three carbons, in which each carbon is tetrasubstituted.

In a more preferred embodiment, the ink composition contains a dye in which $R_4$, $R_5$ and $R_6$ are selected from one of the following groups: sulfonate, sulfinate, carboxylate, hydroxyl, phosphonate, or substituted sulfonamide.

In a more preferred embodiment, the ink composition contains a dye in which $R_5$ is a group capable of imparting water solubility and may be selected from one of the following groups: sulfonate, carboxylate, hydroxyl, phosphonate, or substituted sulfonamide In a more preferred embodiment, the ink composition contains a dye in which $R_2$ is a cyano group, an acyl group, a carboxy or carboalkoxy group or a sulfone.

In a more preferred embodiment, the ink composition contains a dye in which $R_3$ is H or an alkyl group having four or fewer carbon atoms.

In a more preferred embodiment, the ink composition contains a dye in which $R_1$ is a tertiary butyl group.

In a more preferred embodiment, the ink composition contains a dye in which $R_4$ or $R_6$ is a sulfonate group and $R_5$ is a sulfonate or carboxylate group in a position para to the $R_4$ or $R_6$ group.

In the most preferred embodiment, the ink composition contains a dye in which said dye comprises the structure represented by 4:

$R_4$ may be any non-metallic group that is not hydrogen and is an ionizable group chosen from the following: hydroxy, sulfonate, sulfinate, carboxyl, substituted or unsubstituted sulfonamido, or phosphonate;

$R_5$ may be H or any non-metallic group or groups and may be present in any other position or positions on the aromatic ring that are not occupied by $R_4$;

any two of either $R_4$ and $R_5$ or $R_5$ and $R_6$ may be part of a carbocyclic or heterocyclic ring that is fused to the aromatic ring attached to the pyrazole nitrogen, with the proviso that at least one group capable of imparting water solubility to the dye is present in any position of either fused ring;

$R_5$ may be part of a carbocyclic or heterocyclic ring that is fused to the aromatic ring attached to the pyrazole nitrogen in any two adjacent positions not occupied by $R_4$ or $R_6$ with the proviso that at least one of $R_4$ or $R_6$ represents any ionizable group which is capable of imparting water solubility to the dye.

In the most preferred embodiment, the ink composition contains a dye in which $R_7$ represents a hydrogen, a substituted or unsubstituted alkyl or a substituted or unsubstituted alkenyl group.

In the most preferred embodiment, the ink composition contains a dye in which $R_7$ represents a branched or straight chain alkyl group of up to 8 carbons that bears a phenoxy substituent in any position along the chain and $R_1$ is a t-butyl group.

The dyes of the present invention should have adequate water solubility to enable preparation of an ink formulation containing between 2 and 10% dye.

Below are examples of dyes of the invention. The dyes in the present invention include but are not limited to these examples. The dyes are shown in the azo tautomeric form, but any example may exist in either the hydrazone tautomeric form or a mixture of hydrazone and azo forms. The dyes are shown with acidic groups in protonated form but any ionized form associated with a positive counterion of any type may be included:

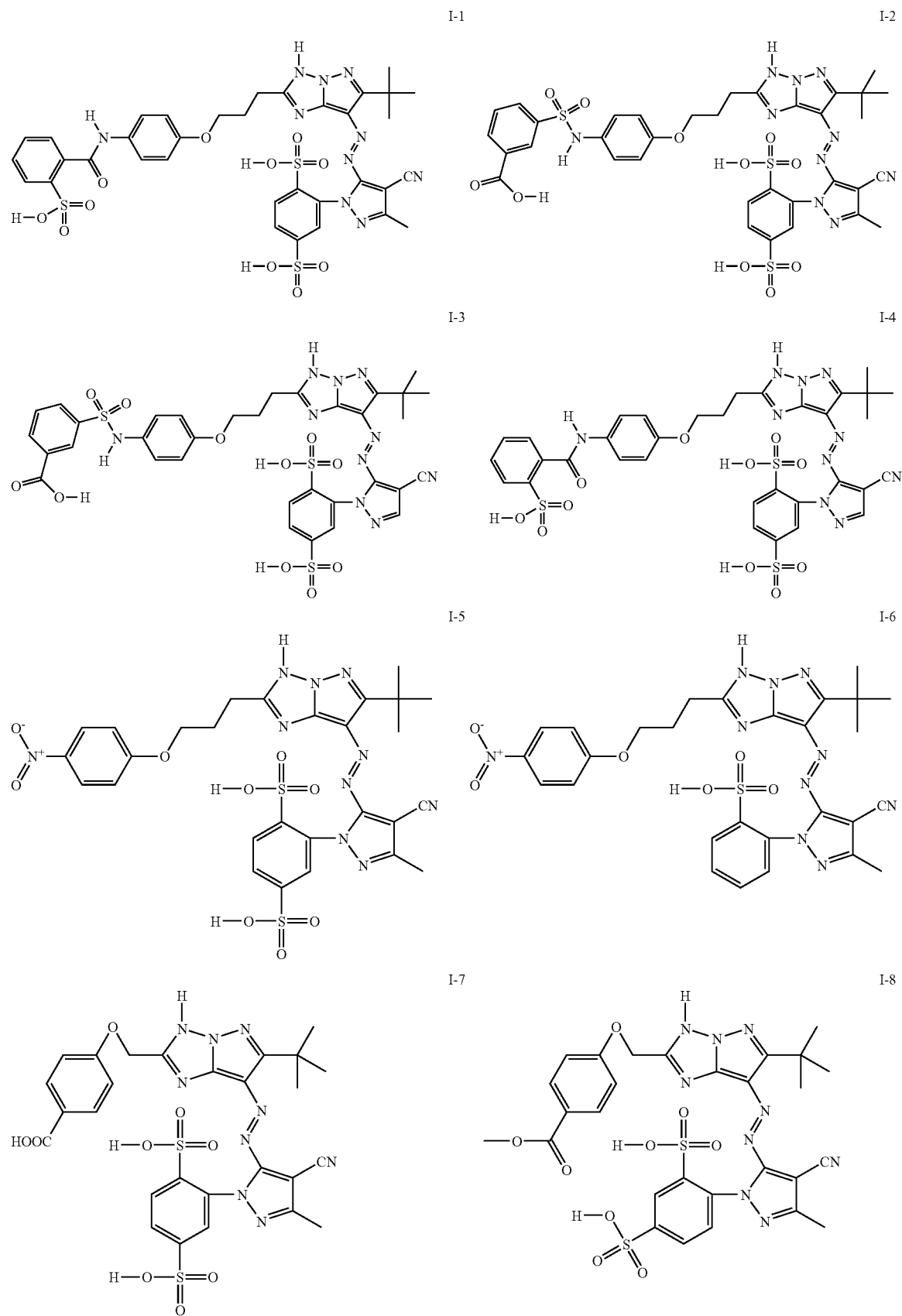

-continued
I-9
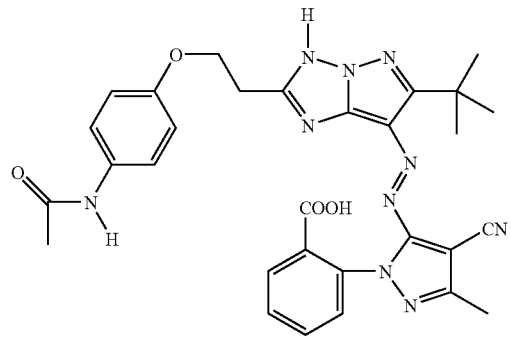
I-10
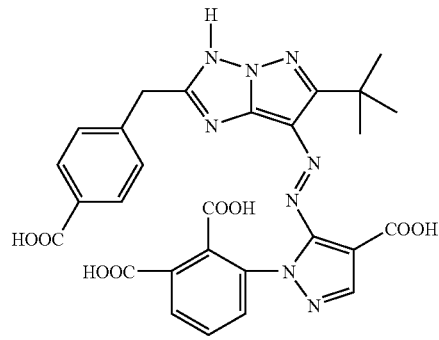
I-11
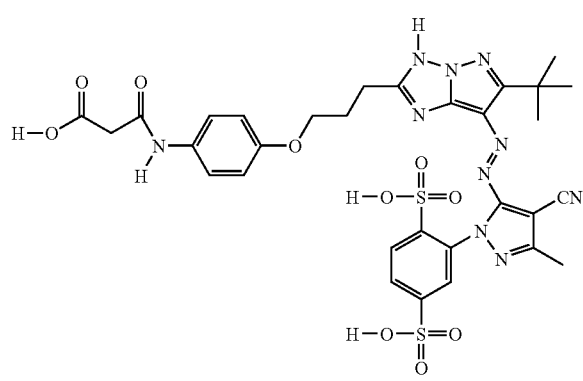
I-12
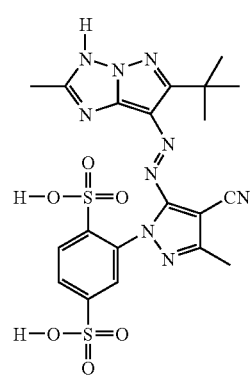
I-13
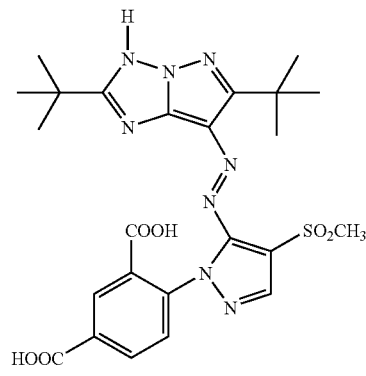
I-14
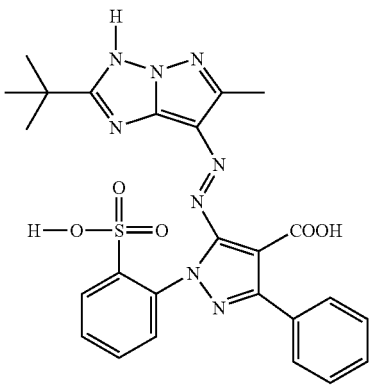
I-15
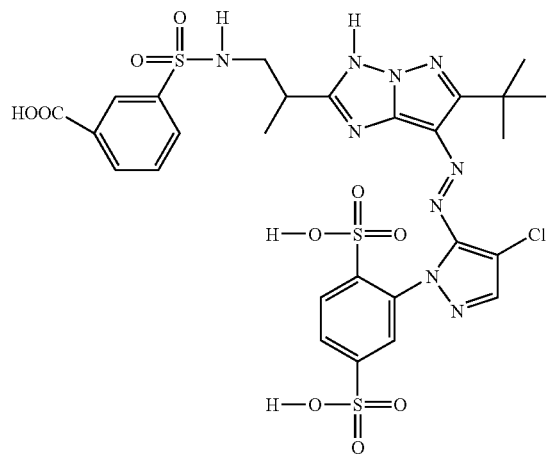
I-16
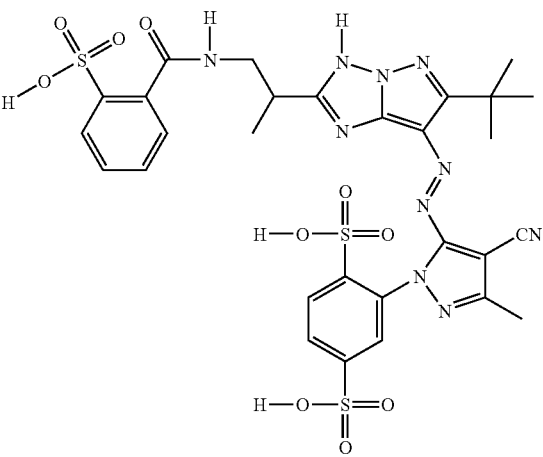

-continued
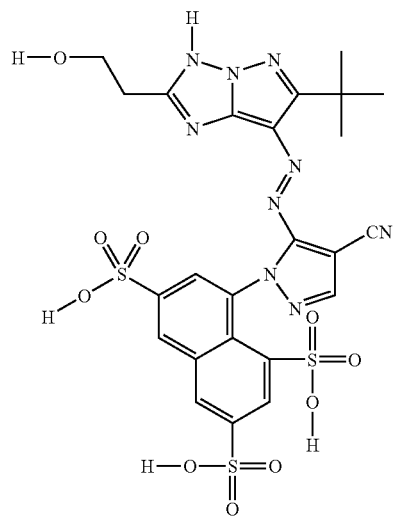
I-17
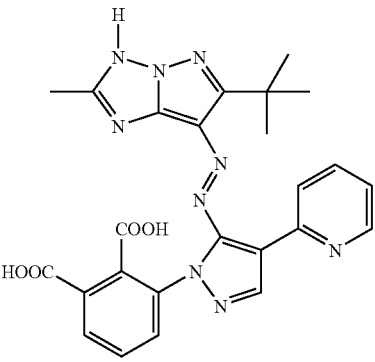
I-18
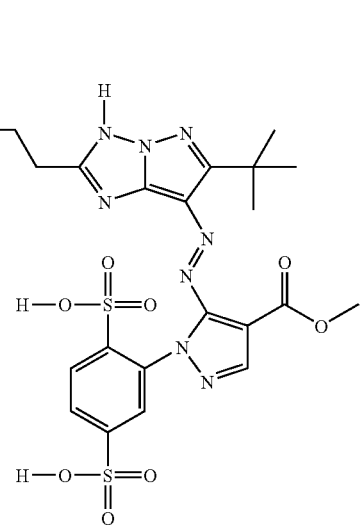
I-19
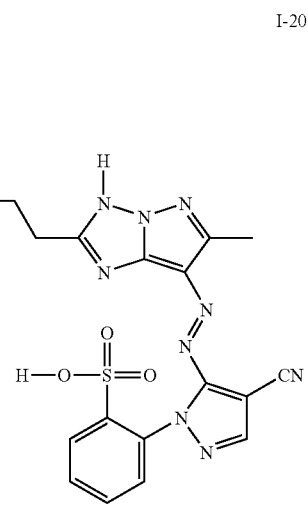
I-20
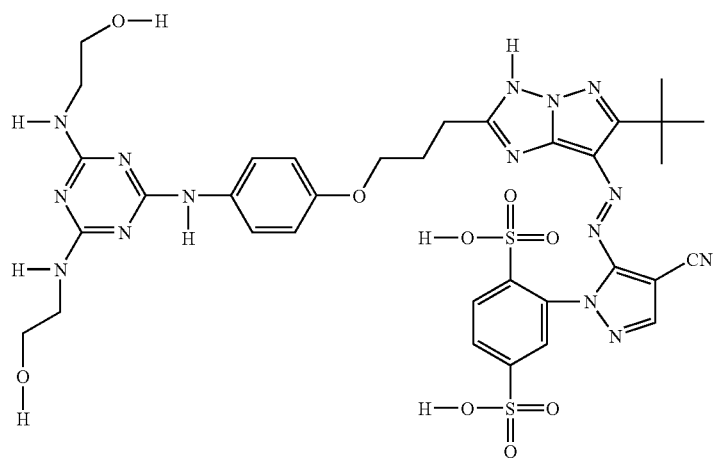
I-21

I-22
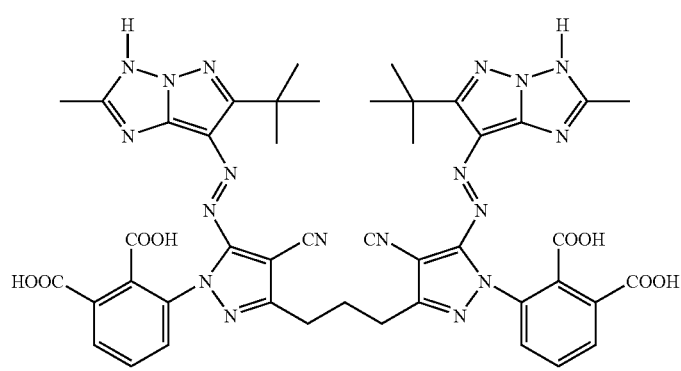
I-23
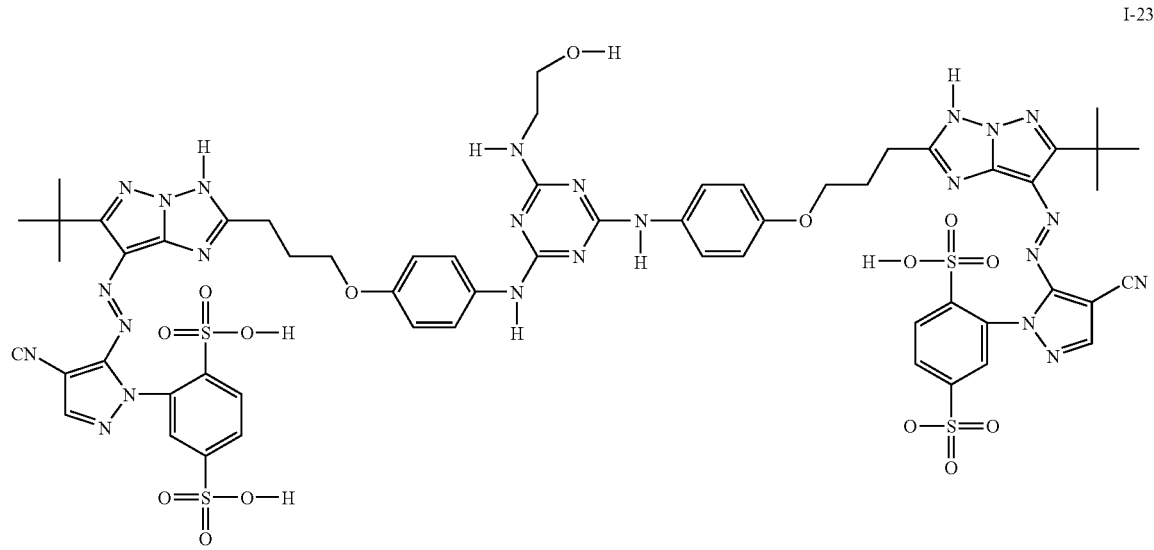
I-24
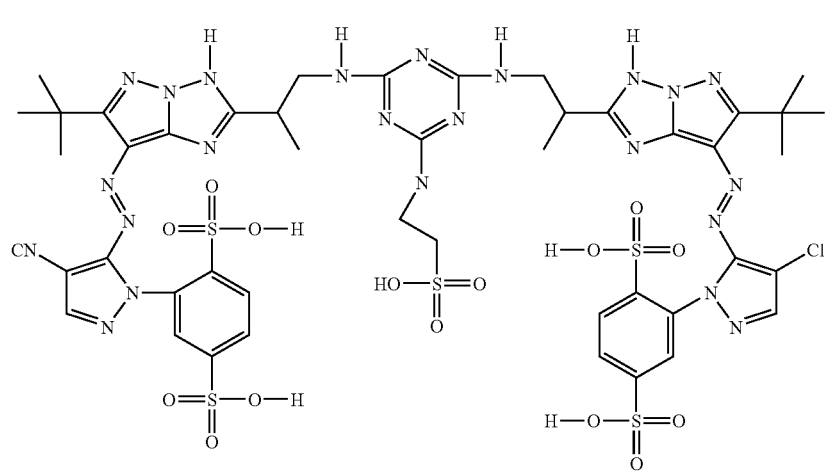

-continued
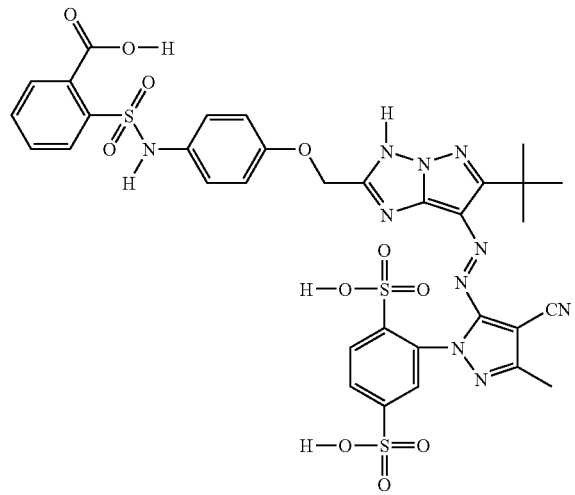
I-25
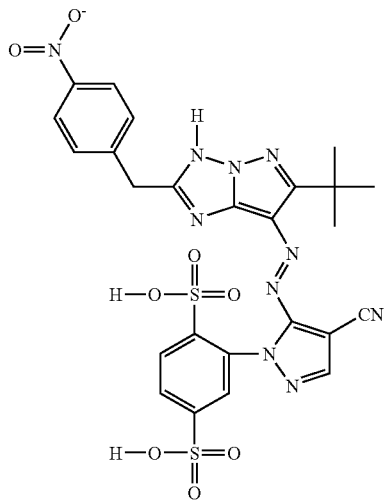
I-26
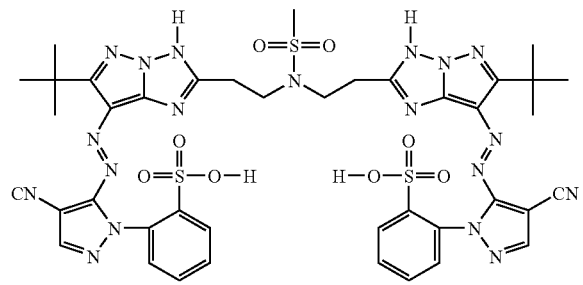
I-27
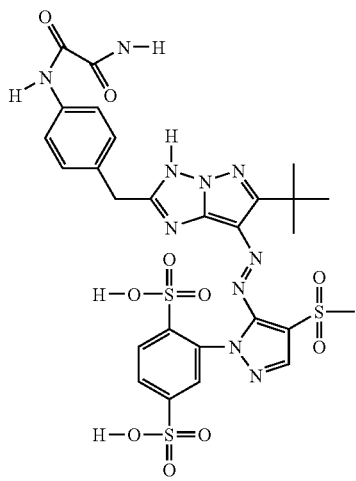
I-28
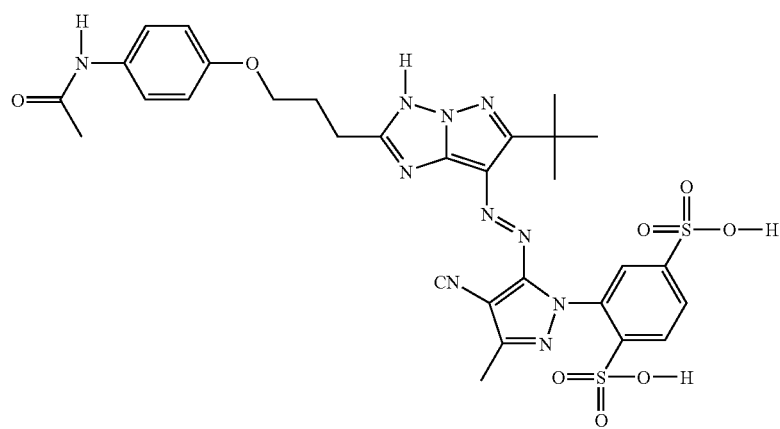
I-29

-continued
I-30
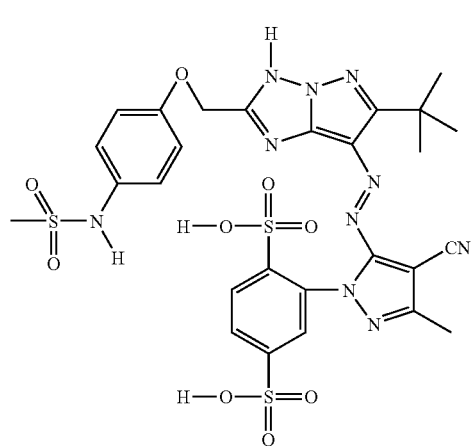
I-31
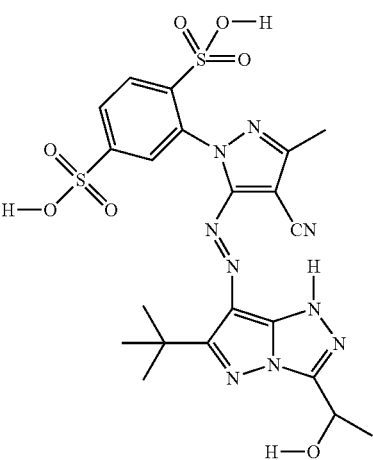
I-32
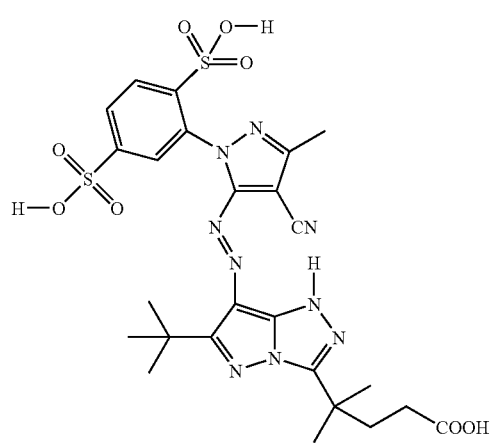
I-33
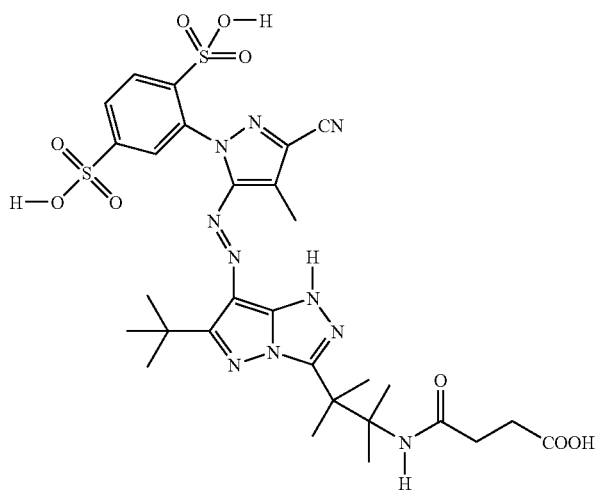
I-34
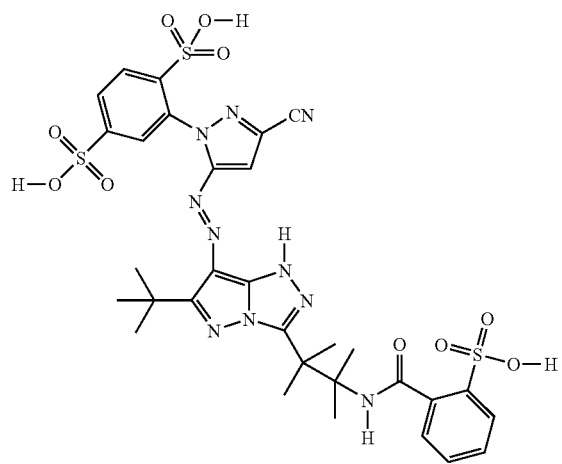
I-35
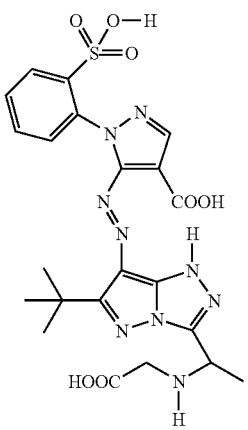

-continued
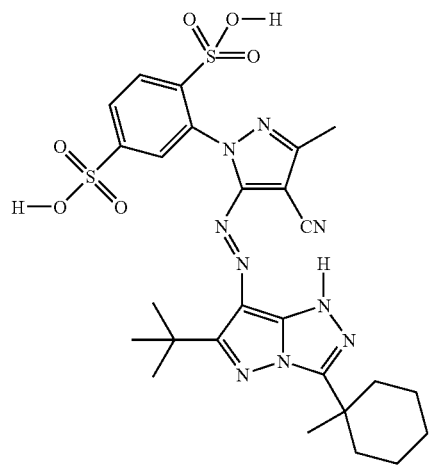
I-36
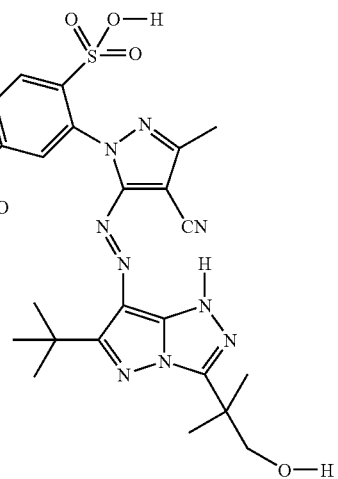
I-37
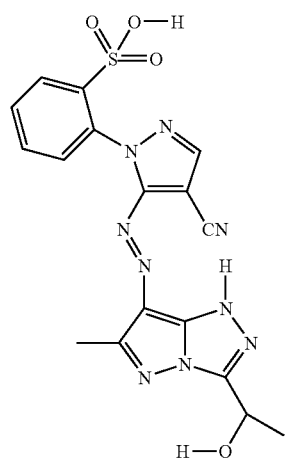
I-38
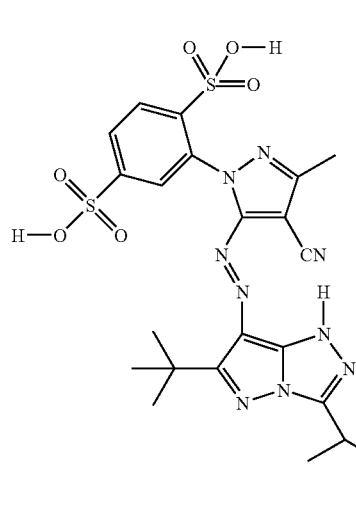
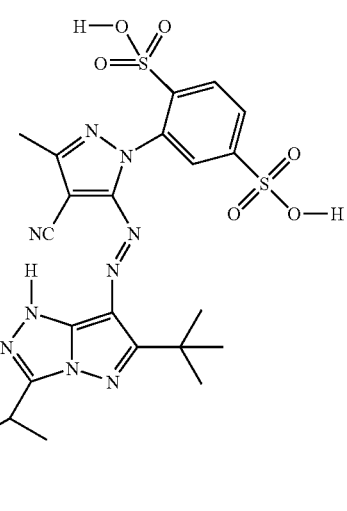
I-39

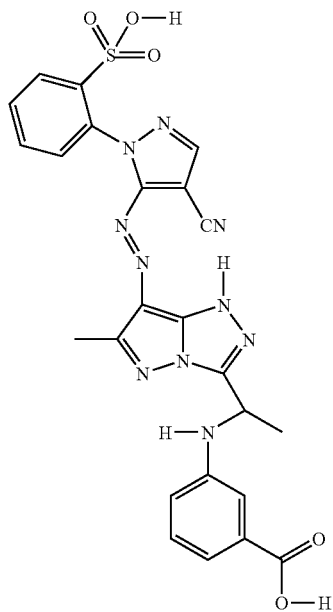

I-40

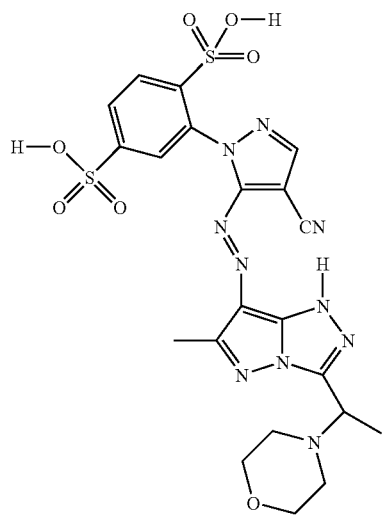

I-41

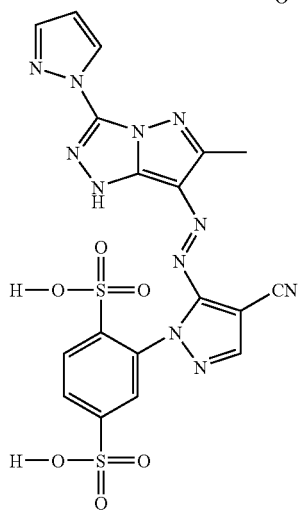

I-42

Dyes I-1–I-5 are preferred because they give the best combination of stability and physical features.

In general, the above dyes comprise from about 0.2 to about 8%, preferably from about 2 to about 6% by weight of the ink jet ink composition to get good density without clogging of the ink jet head nozzles.

A humectant or a mixture of humectants preferably is employed in the ink jet composition of the invention to help prevent the ink from drying out or crusting in the orifices of the printhead. Examples of humectants which can be used include polyhydric alcohols, such as ethylene glycol, diethylene glycol (DEG), triethylene glycol, propylene glycol, tetraethylene glycol, polyethylene glycol, glycerol, 1,5 pentanediol, 1,2-hexanediol, 2-ethyl-2-hydroxymethyl-1,3-propanediol (EHMP) 2-methyl-2,4-pentanediol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl, mono-ethyl ether or mono-butyl ether (TEGMBE), poly(ethylene glycol) monobutyl ether (PEGMBE), diethylene glycol dimethyl or di-ethyl ether, and diethylene glycol monobutylether; nitrogen-containing cyclic compounds, such as pyrrolidone, N-methyl-2-pyrrolidone, 1,3-dimethyl-2-imidazolidinone and urea; and sulfur-containing compounds such as dimethyl sulfoxide and tetramethylene sulfone. Preferred humectants for the inks of the invention include DEG, glycerol, DEGMBE, TEGMBE, 1,2-hexanediol, 1,5-pentanediol, urea, pyrrolidin-2-one, EHMP and mixtures thereof, because inks prepared with these humectants provide the best balance of physical properties. The humectant may be employed in each ink in an amount of from about 5 to about 60 weight percent of water miscible organic solvent. Percentages are based on the total weight of the aqueous carrier.

Water-miscible organic solvents may also be added to the aqueous ink of the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate. Preferred solvents are alcohols because they help the inks to penetrate into the medium and do not prolong drying time.

Surfactants may be added to adjust the surface tension of the ink to an appropriate level. The surfactants may be anionic, cationic, amphoteric or nonionic. Preferred surfactants include Surfynol® 465 (available from Air Products Corp.) and Tergitol® 15-S-5 (available from Union Carbide) because inks prepared with these surfactants provide the best balance of physical properties.

A biocide may be added to the composition of the invention to suppress the growth of micro-organisms such as molds, fungi, etc. in aqueous inks. A preferred biocide for the ink composition of the present invention is Proxel® GXL (Zeneca Specialties Co.) at a final concentration of 0.00001–0.5 wt. %.

The pH of the aqueous ink compositions of the invention may be adjusted by the addition of organic or inorganic acids or bases. Useful inks have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethylenediamine.

A typical ink composition of the invention comprises, for example, the following constituents by weight: colorant (0.2–8%), water (20–95%), a humectant (5–70%), water miscible solvents (2–20%), surfactant (0.1–10%), biocide (0.00001–0.0002) and pH control agents (0.1–10%).

Additional additives which may optionally be present in the ink jet ink composition of the invention include thickeners, conductivity enhancing agents, anti-kogation agents, drying agents, and defoamers.

The ink jet inks provided by this invention may be employed in ink jet printing wherein liquid ink drops are applied in a controlled fashion to an ink receptive layer substrate, by ejecting ink droplets from a plurality of nozzles or orifices of the print head of an ink jet printer.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1.

The ink of the invention may be utilized in any ink printing process. Although preferred for ink jet use, it also could be used for any printing or writing process that employs ink. Typical of such processes are pen plotters and pens. The inks are suitable for use with any of the common ink jet heads for ejecting ink droplets.

The inks of the invention may be used with any ink jet receiver substrate.

An ink jet recording element typically comprises a support having on at least one surface thereof an ink-receiving or image-receiving layer, and includes those intended for reflection viewing, which have an opaque support, and those intended for viewing by transmitted light, which have a transparent support.

An important characteristic of ink jet receiving layers is their need to dry quickly after printing. To this end, porous recording elements have been developed which provide nearly instantaneous drying as long as they have sufficient thickness and pore volume to effectively contain the liquid ink. For example, a porous recording element can be manufactured by cast coating, in which a particulate-containing coating is applied to a support and is dried in contact with a polished smooth surface.

There are generally two types of ink-receiving layers (IRL's). The first type of IRL comprises a non-porous coating of a polymer with a high capacity for swelling and absorbing ink by molecular diffusion. Cationic or anionic substances are added to the coating to serve as a dye fixing agent or mordant for the cationic or anionic dye. This coating is optically transparent and very smooth, leading to a high glossy "photo-grade" receiver. The second type of IRL comprises a porous coating of inorganic, polymeric, or organic-inorganic composite particles, a polymeric binder, and additives such as dye-fixing agents or mordants. These particles can vary in chemical composition, size, shape, and intra-particle porosity. In this case, the printing liquid is absorbed into the open pores of the IRL to obtain a print that is instantaneously dry to the touch.

A glossy, porous IRL usually contains a base layer and a glossy image-receiving layer. When coated on plain paper, the base layer is laid down underneath the glossy image-receiving layer. In order to provide a smooth, glossy surface on the image-receiving layer, special coating processes are often utilized, such as cast coating and film transfer coating. Calendering with heat and pressure is also used in combination with conventional blade, rod or air-knife coating on plain paper to produce gloss on the image-receiving layer.

EXAMPLES

The following examples illustrate the utility of the present invention.

Preparation of Dyes

Azo dyes were prepared by synthetic methods disclosed in U.S. Pat. Nos. 6,174,356 and 4,685,934. Coupler materials were synthesized by methods disclosed in U.S. Pat. No. 5,248,786 and U.S. Pat. No. 5,972,574.

Dyes were initially made using the combinatorial method of parallel synthesis. (See Zhu, Q., Yoon, H., Parikh, P., Chang, Y., and Yao, S., *Tetrahedron Letters* 43 (2002), 5083–5086 for a descriptive example of the combinatorial method of synthesis). Typical libraries were composed of between 24–48 compounds, prepared in a matrix-like array (for a generic example, see Table 1) consisting of test tubes in a rack, each containing 0.5–3 mmol coupler dissolved in a mixture of a suitable water-miscible organic solvent (tetrahydrofuran or methanol) with at least one equivalent of sodium hydroxide and enough water to make a clear solution. The rack was cooled in an ice bath prior to, and during reaction with the diazonium species. The diazonium compounds were prepared by reaction of the aminoheterocycles with one equivalent of nitrosylsulfuric acid (either commercially purchased or prepared in-situ from sodium nitrite and sulfuric acid) in acetic/propionic acid at 0–5° C., with stirring for 2 hours. To each test tube was added an amount of diazonium solution corresponding to 1–1.2 equivalents of diazonium per equivalent of coupler. The test tubes were vigorously shaken during the addition, then allowed to sit in the ice bath for 30 minutes.

TABLE 1

Parallel Synthesis Matrix

| Coupler | Diazonium | | |
|---|---|---|---|
| | Pyrazole A | Pyrazole B | Pyrazole C |
| Coupler 1 | Product 1A | Product 1B | Product 1C |
| Coupler 2 | Product 2A | Product 2B | Product 2C |
| Coupler 3 | Product 3A | Product 3B | Product 3C |
| Coupler 4 | Product 4A | Product 4B | Product 4C |
| Coupler 5 | Product 5A | Product 5B | Product 5C |

The dyes were isolated by filtration, in their protonated acid form, if they were solids, or were directly subjected to purification by Rapid Serial Preparative Liquid Chromatography—Mass Spectrometry (Prep LC-MS) to provide the pure dyes as ammonium salts. Dyes that were isolated as acids were converted to their salts by addition of base during the ink formulation process.

The instrumentation employed for purification of the combinatorial ink-jet libraries synthesized by parallel methods was a Waters-Micromass Preparative LC-MS consisting of the following components: a Waters 4000 preparative HPLC pump, a Gilson 215 Liquid Handler as Auto-injector with 208 racks containing 50 mL Falcon tubes for injection, a second Gilson 215 Liquid Handler as Fraction Collector containing 50 mL glass test tubes, a Waters 515 Pump for "make up" solvent for dilution into a splitter for analytical sampling, a LC Packings custom 1:1000 Preparative Splitter-Diluter for 20–70 mL per min flow rate, and fixed 4:1 splitter on the analytical flow side, a Waters 996 Photo Diode Array Detector with preparative cell on the preparative flow side, and a Micromass ZQ Mass Spectrometer with Z-spray design and electro-spray probe. The instrumentation was controlled by Mass Lynx Software for methods, settings and collection of data, and Fraction Lynx Software for fraction collection. The column used for all purifications was a YMC ODS AQ 4.0×10 cm, 15 μm, radial compression cartridge held in a Waters RCM module with a guard column of the same material.

Samples (50–70 mg in about 2 mL) of crude inkjet dyes, pre-dissolved in an aqueous mixture directly from the work up of the reactions, were injected automatically in series for each separation. For each dye it was typically necessary to repeat this procedure in three to four automated serial runs to accomplish purification of each sample on a 0.5 mmol scale.

Separations were achieved by the following general gradient method, where A=pure $H_2O$, B=buffer (0.1% acetic acid), C=acetonitrile, D=isopropanol. The flow rate was 40 or 45 mL per minute in all cases. Keeping B constant at 10%, C was ramped from 20–60% over the first 15 minutes, then, the solvent strength was increased further by to 100% for the next minutes followed by re-equilibration for the subsequent run over the last 4 minutes for a total run time of 20 minutes. In several cases a gradient of 10–50% C was found advantageous for slightly more polar examples.

Collection of individual peaks was accomplished by triggering fractionation at 450 nM at a pre-determined threshold level. By this method a new compound could be purified every 20 minutes. This gradient method was incorporated into a general combinatorial separation method (sample list in Mass Lynx) for the purification of combinatorial samples in sequential order. The gradient method was designed to facilitate maximum separation of components in the reaction mixtures in a minimum amount of time. It included column wash and equilibration steps to allow for rapid recycling to allow for automated serial injection of multiple samples.

Mass spectral and UV-vis data was accumulated during each preparative HPLC run, including during the particular time of fractionation for the component of interest. This method facilitated the isolation of pure products (generally over 95%) directly from crude reaction mixtures of each sample in rapid sequential order. The data could be reported by either manually selecting data for that period of time during a fraction or peak, or by automatically generated for each peak by Open Lynx software, which generated a report summarizing chromatographic and spectral data.

Each fraction was further analyzed by on an Agilent 1090 analytical reverse phase HPLC using a standard method on a 3 mm by 15 cm YMC-ODS AQ analytical HPLC column. The flow rate was 1.0 mL per min, using a 10–100% acetonitrile versus an inverse 90–0% aqueous phase containing 0.1 M ammonium acetate adjusted to pH. 4.7 with acetic acid. By this procedure, only samples with measured purities over 95% at 254 nm were combined.

The combined fractions for each component of interest were concentrated by rotary-evaporation until the organic solvent was removed and the aqueous solvent reduced to approximately 50–100 mL in each case. This remaining aqueous solvent was lypholized on a Heto Freeze dryer. For complete removal of trace ammonium acetate salts, the isolated sample was redissolved in 50–100 mL deionized water and subjected to a second lypholization to produce the products as pure yellow solids. NMR spectra of dye samples were consistent with structures.

A selection of inventive dyes that showed good stability were prepared on a larger scale for testing in larger scale ink formulations.

Preparation of Inventive Dye I-4

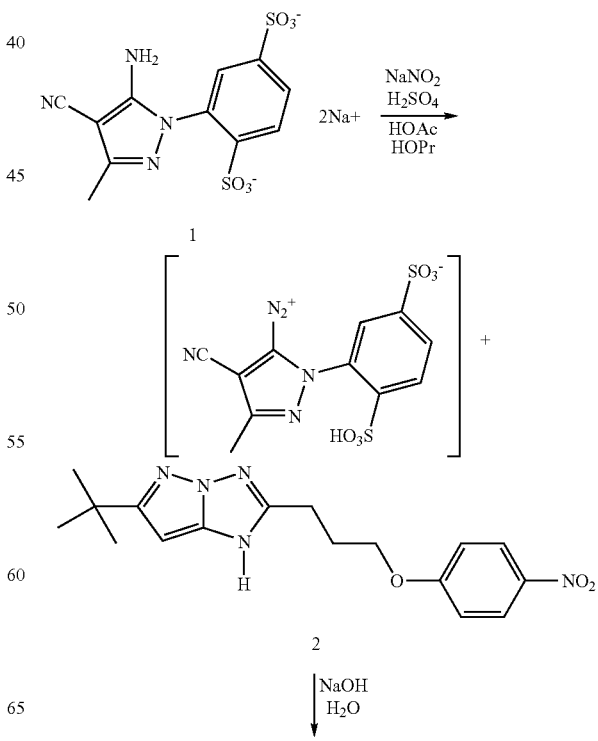

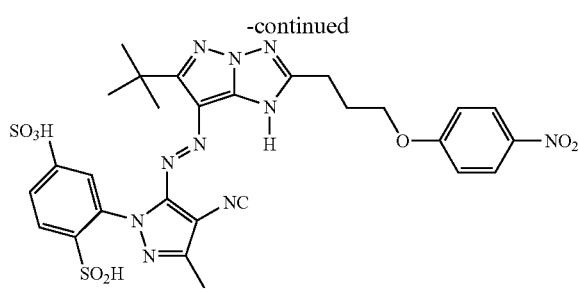

I-4

With stirring, sodium nitrite (0.76 g, 0.011 mol) was added to 25 mL of pre-cooled sulfuric acid in a medium sized beaker. The mixture was heated to 60–65° C. until all solid was dissolved. It was then placed back in an ice water bath and cooled to 15° C. To it was added a mixture of 5 mL propionic acid and 20 mL acetic acid.

The temperature rose to 30° C., and the mixture was stirred for 20 minutes until the temperature was <10° C. To the nitrosyl sulfuric acid mixture was added a slurry of finely ground pyrazole 1 (2.41 gm, 0.006 mol) in 45 mL of propionic acid. The mixture thickened and to a yellow-brown color. It was stirred a total of 2 hrs in an ice bath at 10° C.

Coupler 2 (1.71 gm, 0.005 mol) was dissolved in 10 ml of 3M aq.NaOH. It was diluted further with 10 mL of water and 15 mL of tetrahydrofuran. The solution was cooled to 5° C. and treated with the diazonium solution. After stirring for 15 min. in ice and 30 min at room temperature, the yellow reaction mixture was diluted with saturated NaCl and extracted twice with tetrahydrofuran. The combined organic layers were stripped and the resulting gum was dissolved in a mixture of saturated sodium bicarbonate with enough 1 M NaOH to bring the pH to 10. The aqueous solution was washed two times with ethyl acetate to remove unreacted coupler. The aqueous layer was then adjusted to pH of 1 or less with conc. HCl, diluted with saturated aqueous NaCl and extracted two times with tetrahydrofuran. The tetrahydrofuran layers were combined and stripped. Residual water was azeotroped away with acetonitrile. The resulting solid was diluted with hot acetonitrile and filtered to remove residual inorganic salt. The acetonitrile was reduced in volume, diluted with ether and the free acid of the product dye crystallized as a yellow solid. It was collected and dried under vacuum at 40° C. to provide 1.72 gm, (37%) I-4, which was 96.7A % pure by reverse phase HPLC. NMR and Mass spectra were consistent with the desired structure.

Preparation of Inventive Dye I-5

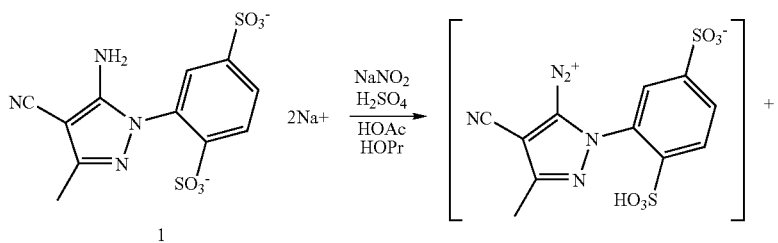

1

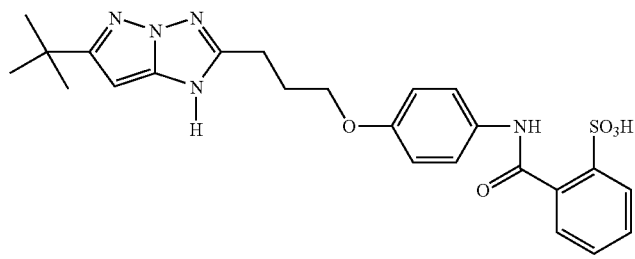

3

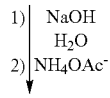

1) NaOH
   H$_2$O
2) NH$_4$OAc$^-$

-continued

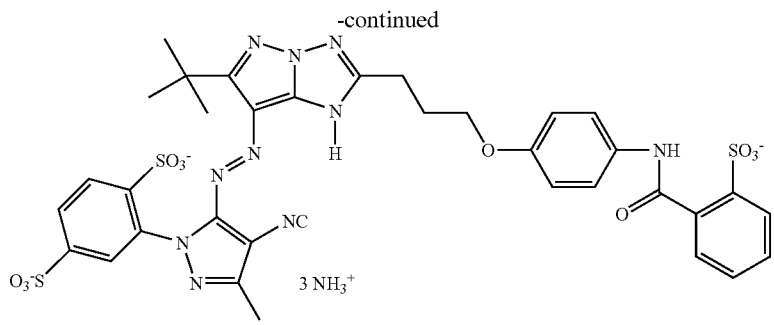

1-5

Pyrazole 1 (2.41 gm, 0.006 mol) was diazotized exactly as described above for preparation of example I-4.

Meanwhile, coupler 3 (4.51 g, 0.0091 mol) was dissolved in 50 mL of 3M aqueous NaOH and cooled in ice with stirring. To the cooled, stirred coupler solution was added the diazonuim solution in one portion. An immediate yellow color formed and the temperature rose to 25° C. then fell back to 10° C. The mixture was stirred for 15 min. in the ice bath and 30 min at room temperature. The pH was still highly acidic. To it was added saturated aqueous NaCl solution and the mixture was shaken in a separatory funnel with tetrahydrofuran. The aqueous layer was extracted with an additional portion of tetrahydrofuran and the organic layers were combined, washed with saturated brine, dried over $MgSO_4$, filtered and concentrated. The residue was dissolved in methanol and filtered to remove salts. It was purified to >95% purity by reverse phase chromatography using an acetonitrile/ammonium acetate buffer gradient. The product-containing fractions were combined, stripped of organic solvent and the remaining aqueous solution was frozen and lyophilized. The process of dissolving in water and lyophilizing was repeated two more times to insure removal of residual ammonium acetate buffer (as confirmed by NMR). The product I-5 (4.6 gm) was obtained as a yellow powder in 59% yield. NMR and Mass spectra were consistent with the desired structure.

The small scale test inks were prepared by dissolving the appropriate amount of dye into an aqueous formulation containing 15.0 wt. % tetraethylene glycol, 3.5 wt. % 1,2-hexanediol, 8 wt. % 2-pyrrolidinone and 0.5 wt. % surfactant (Surfynol 465™, Air Products Co.).

For example, Ink II-1 (Table 2) was prepared by dissolving 34.6 mg of inventive dye I-1 into an aqueous formulation containing 0.45 g tetraethylene glycol, 0.10 g 1,2-hexanediol, 0.24 g 2-pyrrolidinone, 1.5 g 1% wt. Surfynol and 0.67 g water. Some ink solutions were made by adding various amounts of triethanolamine (0.15 to 2.5 wt. %), in order to completely solubilize the dye.

The inventive inks Ink II-2 through Ink II-11 were prepared in an identical fashion as Ink-II-1 except the other inventive dyes shown in Table 2 were used in inks II-2 through Ink II-11 respectively, in the weight percentages shown.

The comparative inks, Ink CI-1 through CI-16, were prepared in an identical fashion as the inventive inks, described above, except that the comparative dyes C-1 through C-16 were used in place of the inventive dyes in the weight percentages shown in Table 3.

All of the above inks were filtered through 0.45 μm Glass microfiber syringe-less filters for removal of particulates that could clog the valves of the dispenser.

Printing of Test Images Using the Cartesian Technologies™ Microdispenser

For convenience and ease of handling purposes, many of the dyes described above were formulated as inks with a final weight of about 3 g. However, the printing process using the micro-dispenser does not need more than 0.5 g of ink. From the examples described above, one can see that this amount can be easily achieved with less than 10 mg of dye sample. Results of stability testing using microjet printed patches mirrored that of samples printed with standard ink jet heads as shown by extensive crossover testing with both commercial and novel dyes.

The filtered inks were placed inside the wells of a standard microtiterplate used as a source plate. The instrument uses an aspiration/dispense routine to print the test image using drop-on-demand ink-jet technology. The test images are printed on various paper receivers mounted in special in-house machined holders called "fade plates." This holder is a clamshell style frame designed to have the same dimensions as a standard micro-titerplate. Different inkjet receivers can be easily installed in these frames to obtain the destination plates.

The receiver area was divided so that 6 different dyes were printed on each individual receiver. Each dye was dispensed in duplicate rows, forming a test image consisting of 48 patches (squares), approximately 5 by 5 mm in size.

The inks were printed on different paper receivers, both porous alumina and silica based. After printing, the paper receiver containing the test images was allowed to dry for 24 hours at ambient temperature and humidity. (Most dyes show good stability on the swellable gel-based receivers, so stability data on porous media is of much greater value in differentiating dye performance.) The data for dye ozone and light stability on porous media are reported in Tables 2 and 3 below for test patches printed with the microdispenser device.

Evaluation of Test Images

Status A reflection density values for each of the inks printed on the paper receivers were measured using an X-Rite® 820 Transmission/Reflection densitometer.

After the initial density readings the paper receiver was cut in strips such that each strip contained duplicate squares of 6 dyes (2 comparatives+4 new dyes), for a total of 12 squares per strip.

The test images were then subjected to three different fade tests: 2 weeks 50 Klux high-intensity daylight irradiation (50% relative humidity), 24 hr ozone exposure (5 ppm ozone concentration in the dark at 50% relative humidity) and 2 weeks ozone room (60 ppb ozone concentration). The Status A densities were measured again at the end of the exposure and the % density retained values were calculated. Larger % density retained represents increased dye stability and is desirable.

Stability Results for the inventive dyes as of this application, printed as inks described above on the porous receivers of interest, are provided in Table 2 and comparative dyes are shown in Table 3 (below):

TABLE 2

Inventive Examples:
Retained dye as a percentage of original density.

| Inventive Dyes | Ink | Wt % dye In test ink | Tests | % density retained Porous silica medium | % density retained Porous alumina medium |
|---|---|---|---|---|---|
| I-1 | II-1 | 1.2 | HI Daylight fade | 91 | 92 |
|  |  |  | HI Ozone fade | 79 | 86 |
|  |  |  | LI Ozone fade | 98 | 95 |
| I-2 | II-2 | 1.2 | HI Daylight fade | 95 | 93 |
|  |  |  | HI Ozone fade | 68 | 92 |
|  |  |  | LI Ozone fade | 97 | 97 |
| I-4 | II-3 | 0.8 | HI Daylight fade | 72 | 96 |
|  |  |  | HI Ozone fade | 71 | 81 |
|  |  |  | LI Ozone fade | 97 | 96 |
| I-5 | II-4 | 0.9 | HI Daylight fade | 87 | 93 |
|  |  |  | HI Ozone fade | 82 | 92 |
|  |  |  | LI Ozone fade | 96 | 94 |
| I-11 | II-5 | 0.8 | HI Daylight fade | 89 | 91 |
|  |  |  | HI Ozone fade | 57 | 86 |
|  |  |  | LI Ozone fade | 87 | 95 |
| I-12 | II-6 | 0.7 | HI Daylight fade | 92 | 92 |
|  |  |  | HI Ozone fade | 65 | 89 |
|  |  |  | LI Ozone fade | 107 | 92 |
| I-31 | II-7 | 0.8 | HI Daylight fade | 77 | 90 |
|  |  |  | HI Ozone fade | 62 | 76 |
|  |  |  | LI Ozone fade | 100 | 91 |
| I-32 | II-8 | 0.9 | HI Daylight fade | 88 | 92 |
|  |  |  | HI Ozone fade | 69 | 76 |
|  |  |  | LI Ozone fade | 90 | 88 |
| I-33 | II-9 | 0.5 | HI Daylight fade | 57 | 82 |
|  |  |  | HI Ozone fade | 43 | 85 |
|  |  |  | LI Ozone fade | 80 | 92 |
| I-36 | II-10 | 0.8 | HI Daylight fade | 85 | 102 |
|  |  |  | HI Ozone fade | 70 | 79 |
|  |  |  | LI Ozone fade | 86 | 89 |
| I-37 | II-11 | 0.8 | HI Daylight fade | 90 | 106 |
|  |  |  | HI Ozone fade | 73 | 68 |
|  |  |  | LI Ozone fade | 103 | 96 |

HI daylight = 50 Klux lamp for two weeks.
HI ozone = 5 ppm ozone concentration for 24 hrs.
LI ozone = 60 ppb ozone concentration for two weeks.

TABLE 3

Comparative dyes:
Retained dye as a percentage of original density.

| Comparison Dyes | Ink | Wt % Dye in Test Ink | Tests | % Density Retained Porous silica Medium | % Density Retained Porous alumina Medium |
|---|---|---|---|---|---|
| C-1 DY 132 | CI-1 | 0.6 | HI Daylight fade | 48* | 62* |
|  |  |  | HI Ozone fade | 69* | 72* |
|  |  |  | LI Ozone fade | 86* | 85* |
| C-2 | CI-2 | 0.5 | HI Daylight fade | 7 | 36 |
|  |  |  | HI Ozone fade | 6 | 64 |
|  |  |  | LI Ozone fade | 27 | 81 |
| C-3 | CI-3 | 0.2 | HI Daylight fade | 13 | 21 |
|  |  |  | HI Ozone fade | 9 | 56 |
|  |  |  | LI Ozone fade | 13 | 78 |
| C-4 | CI-4 | 0.4 | HI Daylight fade | 32 | 55 |
|  |  |  | HI Ozone fade | 9 | 78 |
|  |  |  | LI Ozone fade | 43 | 95 |
| C-5 | CI-5 | 0.7 | HI Daylight fade | 42 | 78 |
|  |  |  | HI Ozone fade | 1 | 39 |
|  |  |  | LI Ozone fade | 9 | 72 |
| C-6 | CI-6 | 0.7 | HI Daylight fade | 5 | 27 |
|  |  |  | HI Ozone fade | 2 | 8 |
|  |  |  | LI Ozone fade | 2 | 13 |
| C-7 | CI-7 | 0.6 | HI Daylight fade | 26 | 89 |
|  |  |  | HI Ozone fade | 2 | 11 |
|  |  |  | LI Ozone fade | 2 | 58 |
| C-8 | CI-8 | 0.6 | HI Daylight fade | 9 | 74 |
|  |  |  | HI Ozone fade | 2 | 14 |
|  |  |  | LI Ozone fade | 4 | 57 |
| C-9 | CI-9 | 0.6 | HI Daylight fade | 4 | 14 |
|  |  |  | HI Ozone fade | 1 | 5 |
|  |  |  | LI Ozone fade | 1 | 8 |
| C10 | CI-10 | 0.8 | HI Daylight fade | 72 | 79 |
|  |  |  | HI Ozone fade | 26 | 67 |
|  |  |  | LI Ozone fade | 79 | 87 |
| C-11 | CI-11 | 0.9 | HI Daylight fade | 35 | 68 |
|  |  |  | HI Ozone fade | 6 | 74 |
|  |  |  | LI Ozone fade | 74 | 94 |
| C-12 | CI-12 | 0.6 | HI Daylight fade | 21 | 81 |
|  |  |  | HI Ozone fade | 2 | 6 |
|  |  |  | LI Ozone fade | 4 | 48 |
| C-13 | CI-13 | 0.7 | HI Daylight fade | 44 | 81 |
|  |  |  | HI Ozone fade | 7 | 15 |
|  |  |  | LI Ozone fade | 17 | 53 |
| C-14 | CI-14 | 0.6 | HI Daylight fade | 9 | 38 |
|  |  |  | HI Ozone fade | 13 | 14 |
|  |  |  | LI Ozone fade | 10 | 21 |
| C-15 | CI-15 | 0.8 | HI Daylight fade | 69 | 93 |
|  |  |  | HI Ozone fade | 4 | 31 |
|  |  |  | LI Ozone fade | 11 | 80 |
| C-16 | CI-16 | 0.7 | HI Daylight fade | 5 | 20 |
|  |  |  | HI Ozone fade | 2 | 4 |
|  |  |  | LI Ozone fade | 2 | 19 |

HI daylight = 50 Klux lamp for two weeks.
HI ozone = 5 ppm ozone concentration for 24 hrs.
LI ozone = 60 ppb ozone concentration for two weeks.
*Average values are given for comparative dyes that were printed more than once.

Testing of Dyes in Standard Inkjet Ink formulation Using Standard Inkjet Printer A selection of dyes were prepared on a larger scale and printed using a standard inkjet printer as described below. Stability data was measured on both porous and swellable inkjet receivers and is reported in table 4.

Preparation of Inks.

Initial evaluation of dye properties was done using inks designed to give a maximum density of approximately 1.0, when printed onto Inkjet receivers using a Lexmark Z51®, thermal head printer. The formulations below achieved this. The concentration of dye in the formulation could be manipulated to achieve other levels of coverage. Inks containing the dyes employed in the invention and control dyes were prepared by dissolving an appropriate amount of the dye in deionized water containing humectants. These consisted of tetraethylene glycol (15 wt. %), 2-pyrrolidinone (8 wt. %) 1,2 hexanediol (3.5 wt. %), and a surfactant, Surfynol 465® (Air Products Co.) at 0.5 wt. %. Details are given in the Table 4 below.

Printing of Test Images.

The above inks were then filtered through a 0.45μ polytetrafluoroethylene filter and placed in a clean Lexmark ink cartridge, which was then fitted into the color ink station of the Lexmark Z51® printer.

Various test targets were printed, using a variety of inkjet receivers, to allow examination of several density levels ranging from 100% dot coverage to less than 25% dot coverage. After drying for 24 hours at ambient temperature and humidity, printed samples were subjected to image stability testing under a variety of conditions. These tests are described below. Typically the Status A blue density of the 100% dot coverage (or other) patch was recorded from a fresh sample using an X-Rite@ 820 densitometer. The sample was subjected to incubation and then re-read. The percentage of dye density remaining relative to the fresh sample was calculated, to give a measure of dye stability on a particular receiver.

Atmospheric Contaminants Test:

1. High Intensity

Printed samples were hung in a darkened chamber maintained at room temperature and with a constant atmosphere containing 5 ppm of Ozone, and at a relative humidity of approximately 50%. The samples were removed after one day for density measurements.

2. Low Intensity

Printed samples were hung in a room simulating an office environment for light (lit with domestic fluorescent light), temperature (maintained at room temperature) and humidity, but with a constant atmosphere containing 60 ppb of Ozone. The samples were removed after 2 weeks for density measurements.

High Intensity Simulated Daylight Fading Test:

Samples were mounted in a chamber where they were subjected to 50Klux light exposure from a xenon source for a given period of time, and the percentage of dye remaining was calculated.

TABLE 4

Larger Scale Print Testing:
Percent dye retained at maximum density

| Dye | Ink | Wt % dye in Test ink | Tests | % Density Retained Porous Silica Medium | % Density Retained Porous Alumina Medium | % Density Retained swellable Medium |
|---|---|---|---|---|---|---|
| I-11 | II-12 | 1.89 | HI Daylight fade | 84 | 90 | 91 |
|  |  |  | HI Ozone fade | 49 | 85 | 98 |
|  |  |  | LI Ozone fade | 85 | 93 | 95 |
| I-29 | II-13 | 3.01 | HI Daylight fade | 89 | 87 | 85 |
|  |  |  | HI Ozone fade | 93 | 84 | 83 |
|  |  |  | LI Ozone fade | 98 | 93 | 81 |
| I-1 | II-14 | 5.76 | HI Daylight fade | 93 | 93 | 96 |
|  |  |  | HI Ozone fade | 72 | 92 | 100 |
|  |  |  | LI Ozone fade | 92 | 96 | 98 |
| I-2 | II-15 | 5.84 | HI Daylight fade | 98 | 95 | 96 |
|  |  |  | HI Ozone fade | 69 | 89 | 99 |
|  |  |  | LI Ozone fade | 94 | 95 | 97 |
| C-1 Direct Yellow 132 | CI-17 | 2.81 | HI Daylight fade | 67* | 79* | 89* |
|  |  |  | HI Ozone fade | 71* | 72* | 95* |
|  |  |  | LI Ozone fade | 83* | 85* | 97* |
| C-17 | CI-18 | 4.13 | HI Daylight fade | 54 | 74 | 72 |
|  |  |  | HI Ozone fade | 10 | 82 | 94 |
|  |  |  | LI Ozone fade | 53 | 91 | 97 |
| C-18 Acid yellow 23 | CI-19 | 2.69 | HI Daylight fade | 7* | 7* | 8* |
|  |  |  | HI Ozone fade | 5* | 23* | 93* |
|  |  |  | LI Ozone fade | 25* | 67* | 90* |
| C-19 Acid yellow 17 | CI-20 | 2.63 | HI Daylight fade | 23 | 34 | 30 |
|  |  |  | HI Ozone fade | 3 | 27 | 87 |
|  |  |  | LI Ozone fade | 5 | 67 | 96 |
| C-120 Direct Yellow 86 | CI-21 | 1.90 | HI Daylight fade | 66* | 82* | 85* |
|  |  |  | HI Ozone fade | 81* | 80* | 98* |
|  |  |  | LI Ozone fade | 88* | 85* | 94* |

HI daylight = 50 Klux lamp for two weeks.
HI ozone = 5 ppm ozone for 24 hrs.
LI ozone = 60 ppb ozone for two weeks.
*average values are given for comparative dyes that were printed more than once.

Comparative Compounds
C-1
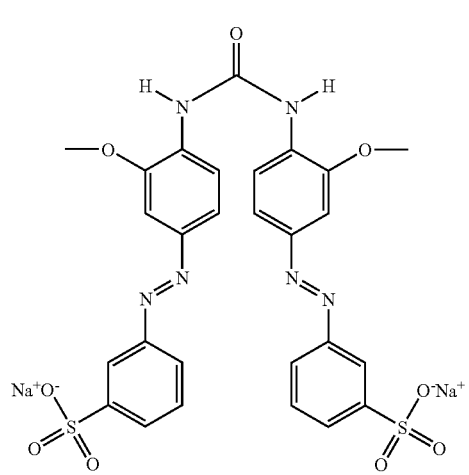
C-2
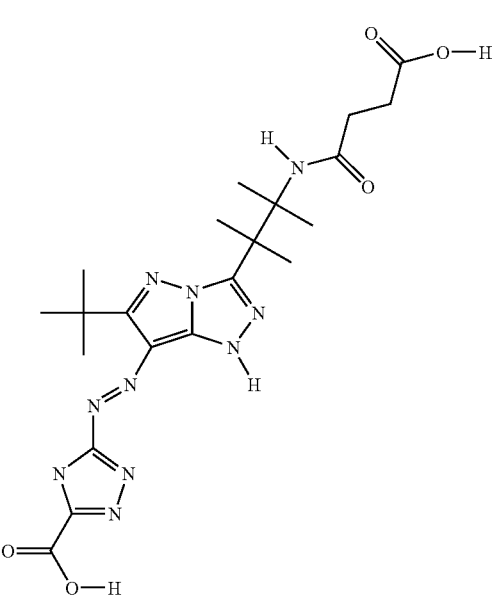
C-3
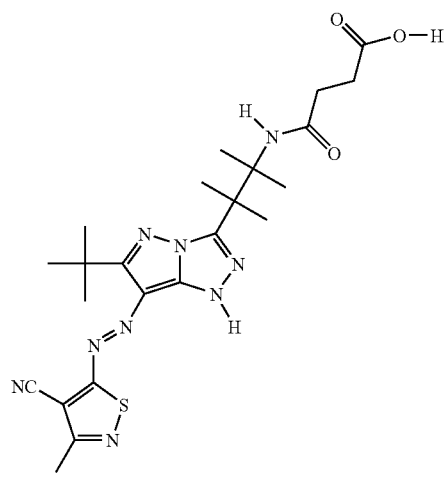
C-4
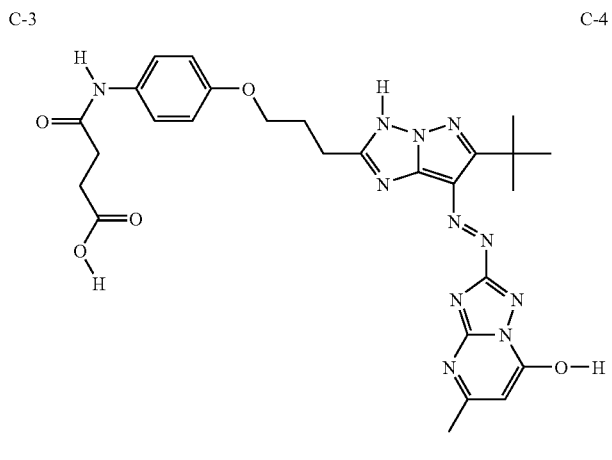
C-5
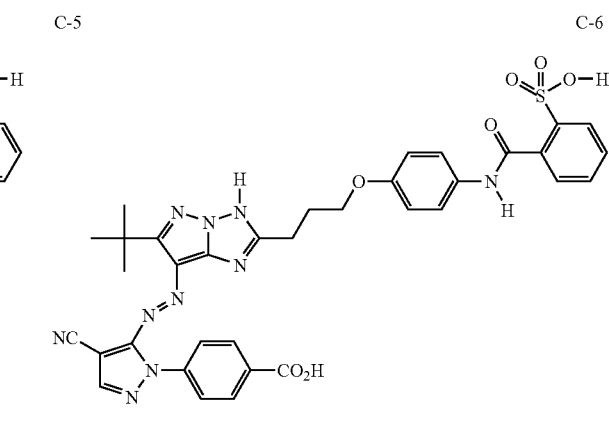
C-6
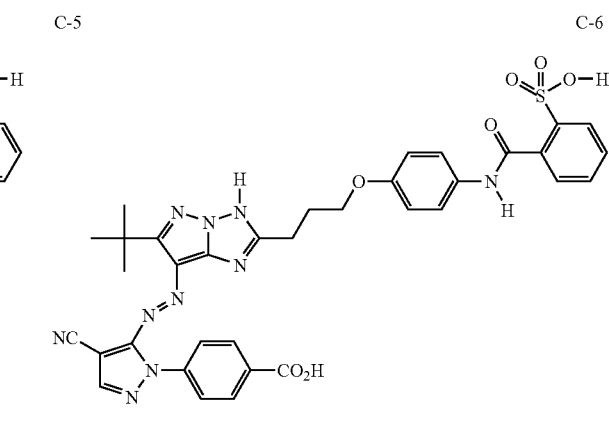

C-7
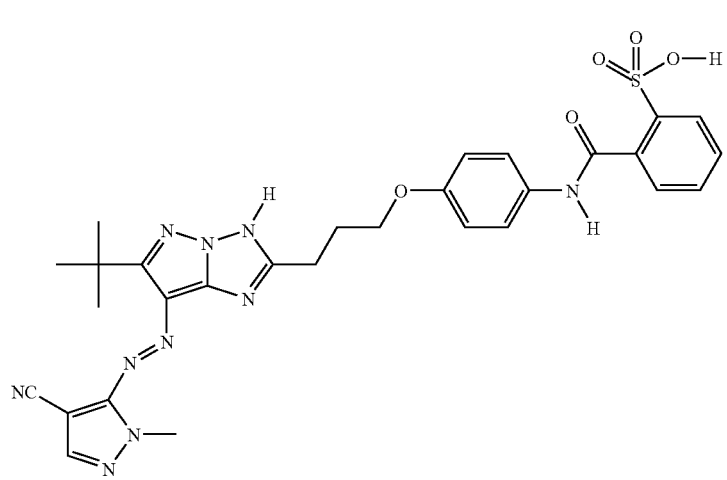
C-8
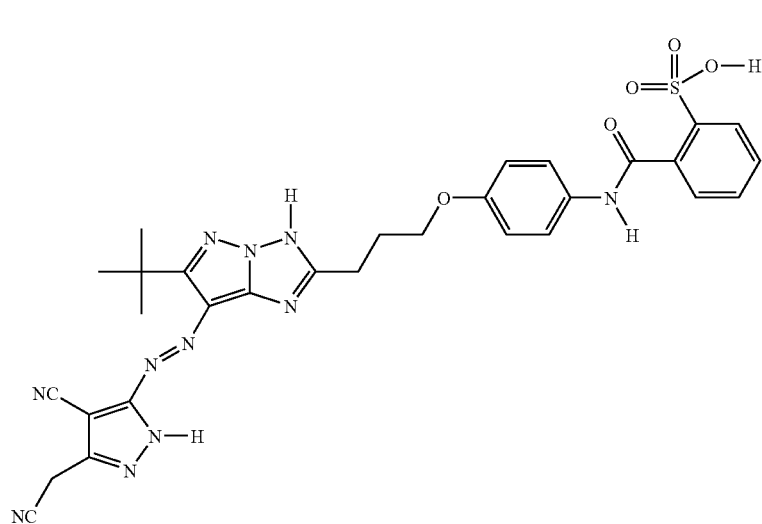
C9
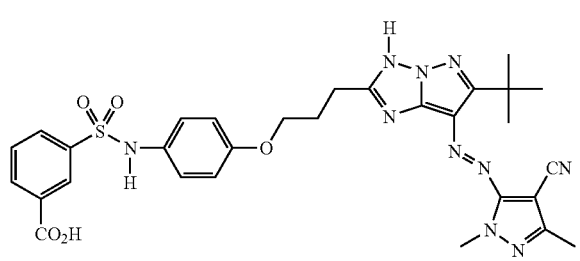
C-10
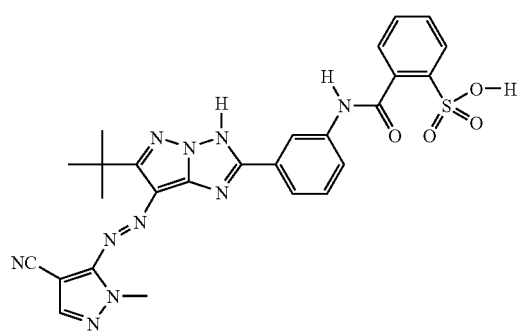

-continued
C11
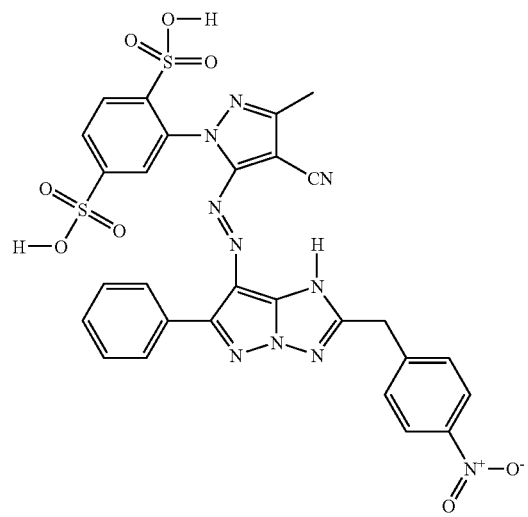
C-12
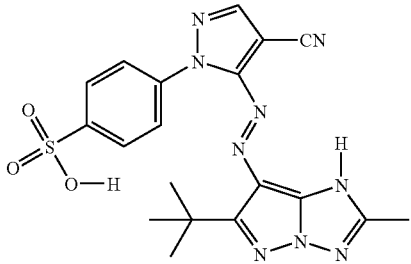
C13
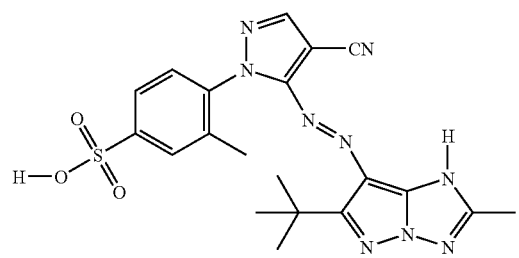
C-14
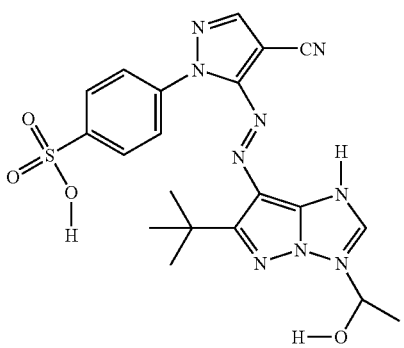
C-15
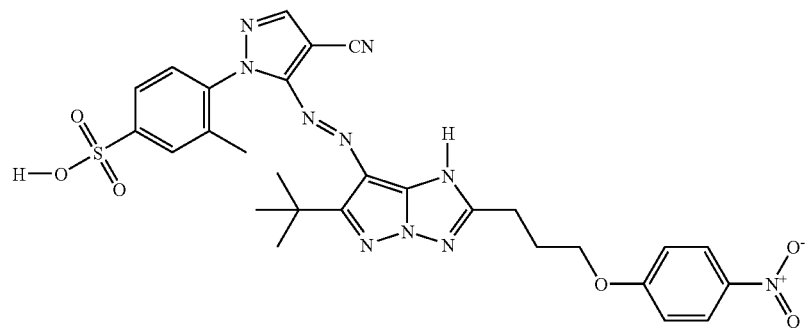
C-16
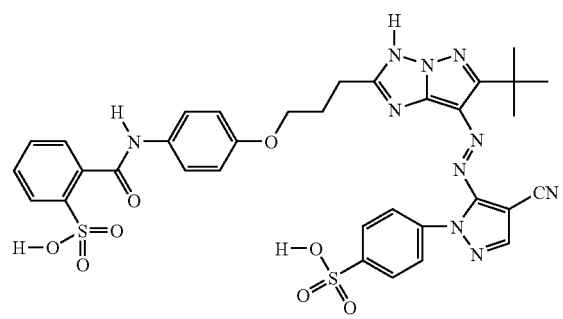
C-17
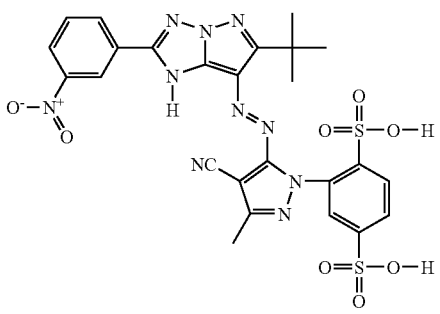

-continued

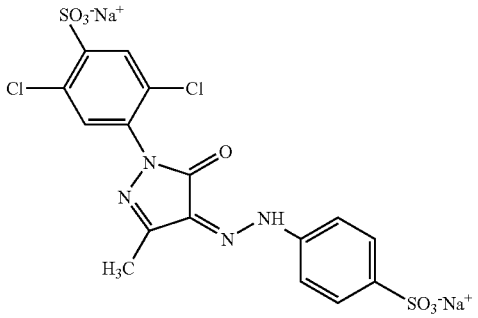

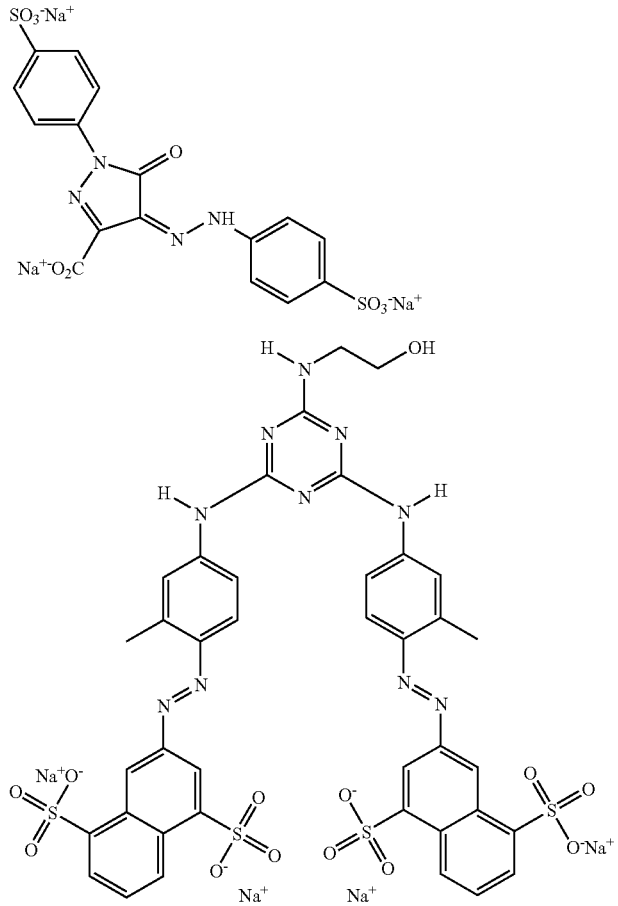

The above data show that inks containing the dyes employed in the invention yield more light stable images than closely related analogs. Analogues of the chromophore classes disclosed in the most closely related art are among the comparatives and these dyes do not show increased stability when printed. The invention has been described in detail with particular reference to certain preferred embodiments thereof, but it will be understood that variations and modifications can be effected within the spirit and scope of the invention.

What is claimed is:

1. An ink composition comprising a dye, wherein said dye comprises a structure of Formula 2:

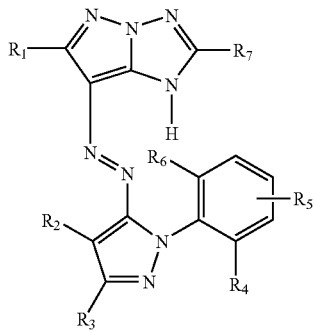

wherein $R_1$ represents a hydrogen atom, a cyano group, a substituted or unsubstituted alkyl group, a substituted or unsubstituted cycloalkyl group, a substituted or unsubstituted alkenyl group, a substituted or unsubstituted aralkyl group, an alkylthio group, an arylthio group, an acyl group, a substituted acyl group, a carboxyl group, a carbamoyl group, or a heterocyclic group; $R_7$ represents a hydrogen, a substituted or unsubstituted alkyl or a substituted or unsubstituted alkenyl group, a substituted or unsubstituted alkyoyl group or a heterocyclic group;

$R_2$ represents, a substituted or unsubstituted alkyl group, a substituted or unsubstituted aryt group, a halogen, a cyano group, a carboxyl or substituted carboxyl group, an acyl group, a substituted acyl group, a carbarnoyl group, a nitro group, an alkyl or aryl sulfone, a sulfonic acid, a substituted or unsubstituted primary or secondary alkyl sulfonamide, a substituted or unsubstituted aryl sulfonamide or a heterocyclic group;

$R_3$ may be hydrogen or any non-metallic group;

$R_4$, $R_5$, $R_6$ may be H or any non-metallic group with the proviso that at least one of $R_4$ or $R_6$ represents any ionizable group which is capable of imparting water solubility to the dye;

$R_5$ may be present in any other position on the aromatic ring that is not occupied by $R_4$ or $R_6$.

2. The ink composition of claim 1 wherein any two of either $R_4$ and $R_5$ or $R_5$ and $R_4$ may be part of a carbocyclic or heterocyclic ring that is fused to the aromatic ring attached to the pyrazole nitrogen, with the proviso that at least one group capable of imparting water solubility to the dye is present in any position of either fused ring.

3. The ink composition of claim 1 wherein $R_5$ may be part of a carbocyclic or heterocyclic ring that is fused to the aromatic ring attached to the pyrazole nitrogen in any two adjacent positions not occupied by $R_4$ or $R_6$ with the proviso that at least one of $R_4$ or $R_6$ represents any ionizable group which is capable of imparting water solubility to the dye.

4. The ink composition of claim 1 wherein said dye has adequate water solubility to enable preparation of an ink formulation containing between 0.2% and 10% dye.

5. The ink composition of claim 1 wherein $R_4$, $R_5$ and $R_6$ may be selected from the group consisting of: sulfonate, sulfinate, carboxylate, hydroxyl, phosphonate, or substituted sulfonamide.

6. The ink composition of claim 1 wherein $R_5$ is a group capable of imparting water soluibility and may be selected from the group consisting of: sulfonate, sulfinate, carboxylate, hydroxyl, phosphonate, or substituted sulfonamide.

7. The ink of claim 1 in which $R_1$ is an alkyl group; $R_7$ is a substituted or unsubstituted alkyl groups.

8. The ink of claim 1 in which $R_2$ is a cyano group, an acyl group, a carboxy or carboalkoxy group or a sulfone.

9. The ink of claim 1 in which $R_2$ is a cyano group, an acyl group, a carboxy or carboalkoxy group or a sulfone.

10. The ink of claim 1 in which $R_3$ is H or an alkyl group having four or fewer carbon atoms.

11. The ink of claim 1 in which $R_1$ is a tertiary butyl group.

12. The ink of claim 1 is which $R_4$ or $R_6$ is a sulfonate group and $R_5$ is a sulfonate or carboxytate group in a position para to the $R_4$ or $R_6$ group.

13. The ink composition of claim 1 in which $R_7$ represents a hydrogen, a substituted or unsubstituted alkyl or a substituted or unsubstituted alkenyl group.

14. The ink composition of claim 1 in which $R_7$ represents a branched or straight chain alkyl group of up to 8 carbons that bears a phenoxy substituent in any position along the chain and $R_1$ is a t-butyl group.

15. The ink composition of claim 1 further comprising a humectant.

16. The ink composition of claim 1 wherein the ink composition comprises between 2 and 10% by weight dye.

17. The ink of claim 16 wherein said ink comprises a solvent.

18. The ink of claim 1 wherein further comprises a pH control agent.

* * * * *

UNITED STATES PATENT AND TRADEMARK OFFICE
CERTIFICATE OF CORRECTION

PATENT NO. : 7,066,992 B2  Page 1 of 1
APPLICATION NO. : 10/732093
DATED : June 27, 2006
INVENTOR(S) : Joan C. Potenza et al.

It is certified that error appears in the above-identified patent and that said Letters Patent is hereby corrected as shown below:

| Issued Patent | | Description of Error |
|---|---|---|
| Column | Line | |
| 42 | 48 | In Claim 1, delete "alkyoyl" and insert --alkynyl-- |
| 42 | 51 | In Claim 1, delete "aryt" and insert --aryl-- |
| 42 | 53 | In Claim 1, delete "carbarnoyl" and insert --carbamoyl-- |
| 42 | 66 | In Claim 2, delete "$R_4$" and insert --$R_6$-- |

Signed and Sealed this
Ninth Day of April, 2013

Teresa Stanek Rea
*Acting Director of the United States Patent and Trademark Office*